3,058,756
TRAILER CONSTRUCTION FOR BOATS HAVING WARPED UNDERSURFACE

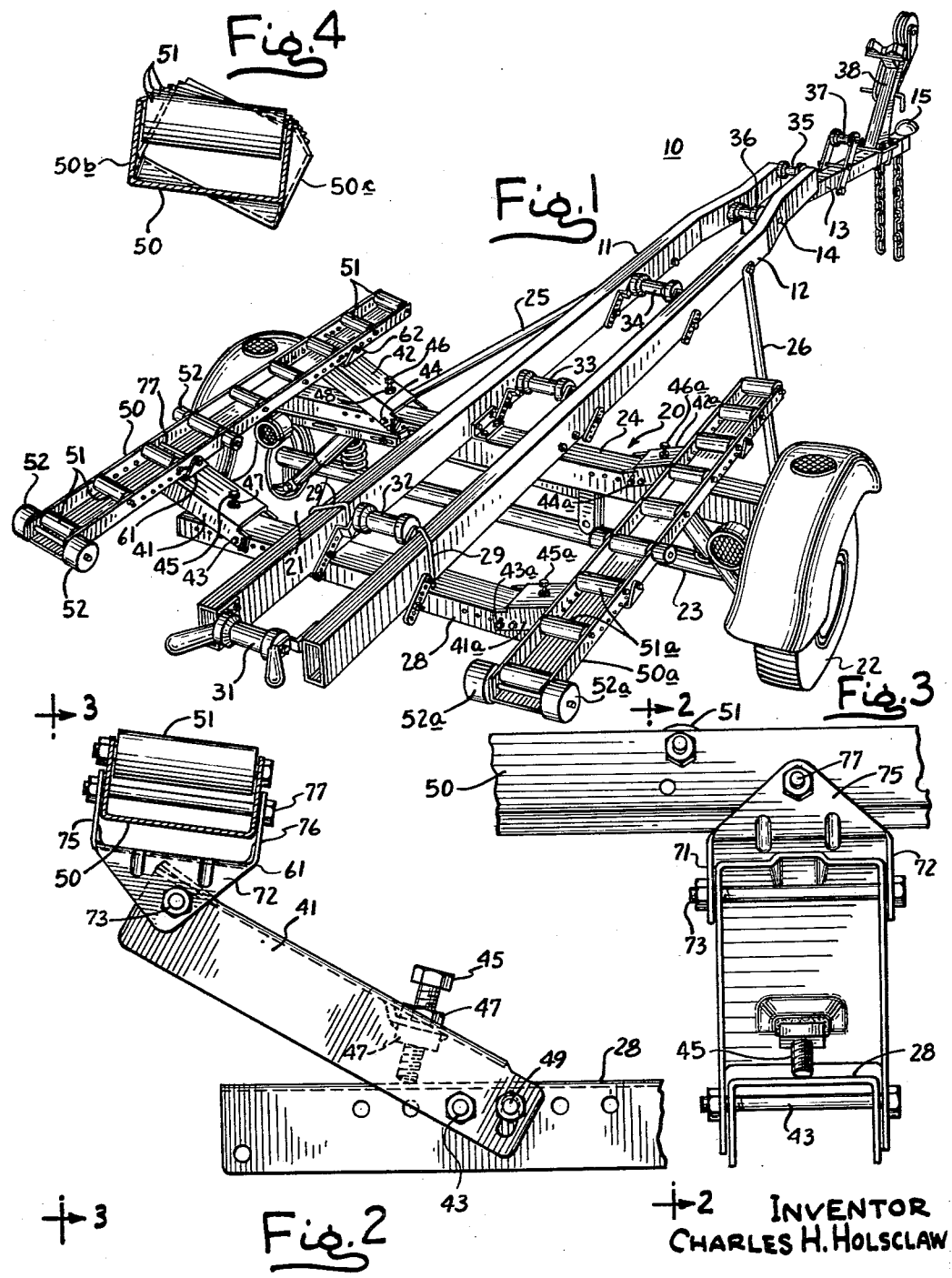

Charles H. Holsclaw, % Holsclaw Bros., Inc., 408 N. Willow Road, Evansville, Ind.
Filed June 5, 1961, Ser. No. 114,869
7 Claims. (Cl. 280—414)

The present invention relates to boat trailers and more particularly to trailers intended for use with boats, and particularly for accommodation of boats having special warped bottom surfaces.

Boat trailers manufactured by various manufacturers are intended to be "general purpose", that is, intended to be capable of adjustment to accommodate variously shaped hulls within a certain size or weight rating. However, with the advent of reinforced plastic as a material of construction and as a result of the design and development work which has been carried out in recent years by various boat manufacturers, hulls of complex and distinctive shapes have been widely sold, including bottom surfaces warped to a much greater degree than has been customary in the past. It has been diffcult, if not impossible, to adjust conventional trailers to conform to such warped surfaces and to provide longitudinal support, distributed over an area, which is to be contrasted with "point" support which tends to set up concentrated stress under rough road conditions. The situation is aggravated by the fact that boat owners tend to load the boat heavily with other gear for transport.

Accordingly, it is an object of the present invention to provide a novel construction of boat trailer which is capable of being adjusted to accommodate boats having a wide range of hull design and including a large amount of warping in the surfaces which must be engaged by the supporting rollers. It is another object of the present invention to provide a boat trailer having longitudinal supporting members to provide distributed area support and in which the longitudinal members are capable of bodily tilting as well as twisting to accommodate the rollers carried thereon to a surface which may vary from planar to one having a large amount of warping from point to point longitudinally of the boat.

It is another object of the present invention to provide a boat trailer which is capable of accommodating hulls of widely different design but which, nevertheless, may be adjusted with minimum time and effort, the preferred embodiment using a total of four screws located at widely separated points to bring about the final adjustment.

It is a further object of the present invention to provide a boat trailer which offers a maximum protection to the boat hull and which supports the bottom over a longer length and greater area than conventional boat trailers.

It is still another object of the present invention to provide a boat trailer which is flexible in adjustment and usage, which is strong and durable, and which includes a minimum number of parts enabling the trailer to be manufactured and sold at a price which is equal to or less than boat trailers of conventional type not having the novel features.

Other objects and advantages of the invention will become apparent upon reading the attached detailed description and upon reference to the drawings in which:

FIGURE 1 is a perspective of a boat trailer constructed in accordance with the present invention.

FIG. 2 is a fragmentary "rear" view showing the supporting arm construction and looking along the line 2—2 in FIG. 3.

FIG. 3 is a fragmentary view looking along the line 3—3 in FIG. 2.

FIG. 4 is a diagrammatic end view of one of the roller channnels showing twisting of the channel for accommodation to the warped bottom of a boat hull.

While the invention has been described in connection with a preferred embodiment, it will be understood that I do not intend to be limited to the embodiment disclosed but intend to cover the various alternative and equivalent constructions which may be included within the spirit and scope of the appended claims.

Turning now to the drawing, a boat trailer constructed in accordance with the invention and indicated generally at 10 has a longitudinal box tongue formed of spaced longitudinal members 11, 12. The latter may be formed of hollow steel tubes of rectangular cross section. Mounted at the front end of the box tongue 11, 12 is a tilt tongue 13 with which it has a pivot connection 14 and with a ball coupling 15 at its forward end. Secured to the box tongue members 11, 12 is a saddle assembly 20 mounting a pair of wheels 21, 22 on an axle 23 and including a forward transverse member 24. The latter is braced with respect to the tongue by the rods 25, 26. In accordance with preferred practice, the saddle assembly 20 includes springs and linkage for causing the axle 23 to be floatingly mounted with respect to the transverse member 24, but the latter need not be described since it is not a part of the present invention. Secured to the rear end of the box tongue is a rear transverse member 28. Both the forward transverse member and the rear transverse member are securely bolted to the box tongue members to keep the latter in rigid spaced relation. Preferably the rear member 28 is secured by the U-bolts 29 to permit front-to-back adustment.

For supporting and guiding the boat keel, keel rollers 31–35, of rubber or the like, are bridgingly mounted between the tongue members 11, 12 and secured to the latter by apertured brackets to permit relative adjustment of height.

At the rear end of the tilt tongue an auxiliary, protective roller 36 is used. Finally, a roller 37 secured to the tilt tongue serves to receive and support the bow of the boat against the usual winch assembly 38.

In accordance with the present invention paired, left and right-hand brackets are provided at the ends of the transverse members 24, 28 and left and right-hand, longitudinally extending, roller support members are provided, secured to the upper ends of the paired brackets and pivoted thereto, to permit tilting as well as twisting of the longitudinal members to accommodate the same to a warped boat bottom. Referring to the left-hand side of the trailer, brackets 41, 42 are provided which are secured to the transverse members by pivot pins 43, 44, respectively. The brackets 41, 42 are preferably of channel shape and extend upwardly and outwardly with respect to the transverse members to which they are secured. For the purpose of adjusting the angling of the brackets and hence the height of the outer ends thereof, the brackets are provided with adjustable jack screws 45, 46, respectively, which are threaded into nuts 47, 48 which are captive in the respective brackets. Secured to the upper ends of the brackets 41, 42 is a longitudinal roller support member 50 having a series of rollers 51 longitudinally spaced therein. The longitudinal roller support member is also preferably provided with outboard rollers 52 for a purpose which will become clear as the discussion proceeds.

In order to permit tilting and relative twisting of the roller support member 50 about a longitudinal axis, universal joint members 61, 62 are interposed between the upper ends of brackets 41, 42 and the support member 50. Prior to discussing the construction of the universal joint members, it may be noted that an identical construction is provided at the right-hand side of the trailer where corresponding parts carry corresponding reference numerals with the addition of subscript "a."

Taking the adjustable bracket 41 and its associated universal joint as representative (FIGS. 2 and 3), it will be noted that the member 61 has a pair of downwardly turned ears 71, 72 which straddle the walls of the supporting bracket and which are pinned to the supporting bracket by a pivot pin 73 which is longitudinally extending. The universal joint member, moreover, has a pair of upwardly extending ears 75, 76, at right angles to the ears 71, 72, which straddle the longitudinal supporting member 50 and which are connected to the latter by a transversely extending pivot pin 77. A similar universal member is used at the other three positions. It will be apparent to one skilled in the art that floating support is thus provided for the longitudinal member 50 at points widely spaced fore and aft with complete freedom to tilt laterally or twist about a longitudinal axis when the weight of the boat is applied to the rollers and as may be necessary for the rollers to accommodate themselves to the warped surface forming the bottom of the boat, and with complete freedom for the member 50 to tilt either forwardly or backwardly, depending upon the height adjustment of the supporting brackets.

Further in accordance with the invention, the longitudinal roller supporting member 50, and its companion 50a, are preferably formed of thin metal in channel shape which not only encloses and protects the rollers 51 but which permits the above-mentioned freedom of twisting in response to the applied loading. Thus, referring to FIG. 4, which shows a rear end view of the longitudinal member 50, the "near" end is indicated by the outline 50b while the "far" end is indicated by the outline 50c. It is apparent from this view that progressive twisting occurs between the near end and the far end so that each of the rollers 51 occupies a slightly different angled position from the adjacent rollers, permitting each of the rollers to seat over its length notwithstanding the warping. The auxiliary outboard rollers 52, because of their spacing or span, augment the twisting action. While FIG. 4 has been exaggerated for the purpose of showing the principle involved, it will be appreciated that a warp angle of several degrees and up to, say, 10°, in a length of four feet is a practical possibility.

The features and advantages of the present construction will be apparent upon considering a typical adjusting procedure. First of all, a boat is run up onto the trailer, with the keel supported by the keel rollers 31–35, and the latter are adjusted relative to one another so that all make contact with the keel. Following this the position of the pivot pins 43, 44 is checked to determine whether the setting is correct for the width of the boat. Additional pivot pin holes are provided in each of the transverse members 24, 28 so that it is a simple matter to shift the pins 43, 44 laterally in one direction or the other. Normally, alined holes will be chosen but it is possible for special shapes of boat hulls for the pivot pins 43, 44 to be non-alined. After the pins have been positioned, the jack screws 45, 46 are turned, thereby elevating the longitudinal roller supporting member 50 into a fully seated position against the boat bottom. The jack screws 45a, 46a on the opposite side are adjusted either simultaneously or in steps so that the rollers on the longitudinal members are all brought into load bearing contact. The jack screws may be turned to the point where the keel just begins to separate from the keel supporting rollers following which the screws may be backed off. Once proper adjustment of the jack screws has been achieved, the screws may be locked in place by means of lock nuts provided. For the purpose of preventing rattling of the brackets on the transverse members auxiliary clamping screws 49 (see FIG. 2) may be provided which bring the walls of the bracket snugly against the walls of the transverse member.

In the case of a boat bottom of sophisticated design, it is found that the two brackets 41, 42 will usually be adjusted to slightly different heights when the rollers are seated. By adjusting the relative height of the supporting brackets it will be apparent that the weight can be distributed along the rollers as desired, for example, in the case of an outboard motor boat the rear end of the roller supports may, by adjusting the rear bracket slightly "high," be caused to provide direct support of the concentration of weight at the transom. Moreover, it will be found that each of the rollers 51 will be fully seated along its length thereby to provide spaced area support over an appreciable portion of the length of the boat and with the member 50 twisting under the weight of the boat, as may be necessary for full accommodation. The outboard rollers 52 serve to assist the twisting since they provide greater leverage. The rear rollers 52 also serve to protect the boat bottom as the boat approaches during loading and before the longitudinal member 50 is tilted in proper position.

With the two longitudinal supporting members 50 each providing full seating of the sets of rollers, it will be apparent to one skilled in the art that the boat is cradled to the maximum degree and, therefore, capable of resisting the road shock to which it is subjected during transport. Moreover, the twisting afforded by the longitudinal members also serves to provide maximum support in the face of the changing bottom angle as the boat is progressively loaded and unloaded. In this connection, it may also be noted that the support of the channels 50, 50a at spaced points, prevents the excessive teeter-totter action which occurs when the channels are centrally pivoted.

Once the screws 45, 46 have been adjusted, the adjustment need not be touched as long as the trailer is used with the same boat. If the trailer is to be used with a different boat it is a simple procedure, requiring only a few minutes to move the jack screws to a different setting. This is to be contrasted with the conventional boat trailers which do not provide full area support and which may require a half hour or more each time an adjustment is made.

Under normal circumstances the rear transverse member need not be adjusted; however, it will be noted that the provision of the U-bolts 29 and the choice of holes available for attaching the brackets 61, 61a to make such adjustment an easy matter.

Not only is the present boat trailer effective in providing cradled support, but it will be apparent that such support has been provided by a simple construction using a minimum number of parts. Consequently, boat trailers of the present design may be manufactured at a cost which compares favorably to boat trailers not possessing the novel features described above.

The term "freely assume an angled position" means that the connection is such as to permit lateral or side to side rocking movement when the support is accommodated to the angle of the boat bottom, either during loading or when the device is originally adjusted to fit the boat. The term does not therefore necessarily imply a "loose" connection.

I claim as my invention:

1. In a boat trailer, the combination comprising a longitudinal frame having laterally spaced wheels for supporting the same on the ground, left and right-hand pairs of brackets pivoted to the frame and extending upwardly and outwardly therefrom, left and right-hand longitudinally extending roller support members, each having a plurality of longitudinally spaced rollers, universal joints interposed between the outer ends of said brackets and the associated roller support members for connection to the latter at spaced points, each of said brackets having a jack screw for adjusting the upward angling thereof, and said longitudinal support members each being formed of a metal channel having a wall which is sufficiently thin as to permit limited twisting of the support member about its own longitudinal axis under the weight of the boat for accommodation of the rollers thereon to the warped surface of the boat bottom.

2. In a boat trailer, the combination comprising a longitudinal frame providing four widely spaced points of support, two on the left side and two on the right side, adjustable brackets at said points of support having their lower ends pivoted to the frame, first and second longitudinal roller supporting members carrying a plurality of spaced rollers and pivoted to the upper ends of the brackets on the left-hand side and right-hand side, respectively, the pivot connections between the roller supporting members and the adjustable bracket being such as to permit the longitudinal roller support to freely assume an angled position in accordance with the angling of the boat bottom, said longitudinal roller supports being made of relatively light gauge flexible metal so as to permit twisting of each support about its own longitudinal axis thereby to accommodate the rollers to a warped bottom surface for distributed support over the entire length of the supporting member.

3. In a boat trailer, the combination comprising a longitudinal frame providing four widely spaced points of support, two on the left-hand side and two on the right-hand side, a pair of vertically adjustable brackets secured to the points of support on the left and right-hand sides, respectively, with the upper ends of each pair of brackets being in general longitudinal alinement, left and right-hand longitudinal roller supporting members each carrying a plurality of transversely arranged and longitudinally spaced rollers, the upper ends of the brackets being coupled to the associated roller supporting members to permit lateral tilting of the latter and to accommodate twisting of each roller supporting member as it tends to accommodate itself to a warped boat bottom and upon being subjected to the weight of the boat, each roller supporting member having pairs of aligned members straddling the supporting members in outboard positions at points longitudinally spaced thereon to provide leverage for augmenting the twisting of the associated member.

4. In a boat trailer, the combination comprising a longitudinal box tongue having laterally spaced wheels for supporting the same on the ground, a forward transverse member on said tongue, a rear transverse member on said tongue, channel-shaped brackets at the ends of said transverse members pivoted thereto and extending upwardly and outwardly therefrom, left and right-hand longitudinally extending roller support members having a plurality of transversely arranged, longitudinally spaced rollers, universal joints interposed between the outer ends of said brackets and the associated roller support members, each of said brackets having a jack screw for adjusting the upward angling thereof, and said longitudinal support members each being formed of a metal channel having a wall which is sufficiently thin as to permit limited twisting of the support member about its own longitudinal axis under the weight of the boat and for accommodation of the rollers thereon to the warped surface of the boat bottom.

5. In a boat trailer, the combination comprising a longitudinal frame providing four widely spaced points of support, two on the left side and two on the right side, adjustable brackets at said points of support having their lower ends pivoted to the frame, first and second longitudinal roller supporting members carrying a plurality of spaced rollers and pivoted to the upper ends of the brackets on the left-hand side and right-hand side, respectively, the pivot connections between the roller supporting members and the adjustable bracket being such as to permit the longitudinal roller support to freely assume an angled position in accordance with the angling of the boat bottom, said frame having a series of adjustable keel rollers, said longitudinal roller support being made of relatively light gauge flexible metals so as to permit twisting of each support about a longitudinal axis thereby to accommodate the rollers to a warped bottom surface for distributed support over the entire length of the supporting member as the boat is loaded and transported.

6. In a boat trailer the combination comprising a longitudinal frame having left and right hand sides each providing two points of support spaced substantially in the fore and aft direction extending over the rear portion of the frame, left and right hand longitudinal roller supporting members each carrying a plurality of transversely arranged and longitudinally spaced rollers arranged in a substantially common plane, a first point of connection at the forward portion of each supporting member and a second point of connection at the rear portion of the supporting member spaced to correspond to the points of support on said frame, and first and second vertically adjustable brackets interposed between the points of support on the frame and the points of connection on the roller supporting members respectively so that the roller supporting members bear a load which is applied over a substantial area of the bottom of the boat and which is distributed over a substantial length in accordance with the relative height adjustment of the brackets, said first and second brackets including means for permitting lateral bodily angling of the roller supporting member in accordance with the angling of the boat bottom.

7. In a boat trailer the combination comprising a longitudinal frame having left and right hand sides each providing two points of support spaced substantially in the fore and aft direction extending over the rear portion of the frame, left and right hand longitudinal roller supporting channels each carrying a plurality of transversely arranged and longitudinally spaced rollers, a first point of connection at the forward portion of each supporting channel and a second point of connection at the rear portion of the supporting channel spaced to correspond to the points of support on said frame, and first and second brackets interposed between the points of support on the frame and the points of connection on the roller supporting channels respectively so that the roller supporting channel bears a load which is applied over a substantial area of the bottom of the boat and which is distributed therealong in accordance with the relative heights of the said points of the connection, said first and second brackets including means for enabling lateral bodily angling of the roller supporting channels in accordance with the angling of the boat bottom.

References Cited in the file of this patent

UNITED STATES PATENTS

| | | |
|---|---|---|
| 2,789,713 | Agricola | Apr. 23, 1957 |
| 2,798,625 | Mamo | July 9, 1957 |
| 2,817,537 | Atkinson | Dec. 24, 1957 |
| 2,827,188 | Reeder | Mar. 18, 1958 |
| 2,889,946 | Holsclaw | June 9, 1959 |
| 2,933,328 | McIntyre et al. | Apr. 19, 1960 |